Figure 1:
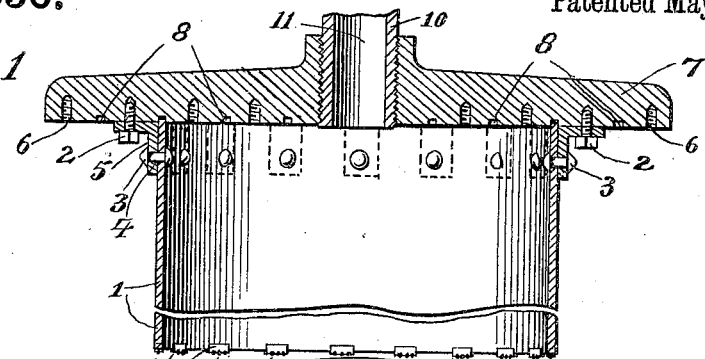

G. N. WILLIAMS, Jr. & J. WEGNER.
CAP PLATE FOR CYLINDRICAL SAW BLADES AND MEANS FOR ATTACHMENT
OF THE SAW BLADE THERETO.
APPLICATION FILED SEPT. 13, 1907.

922,650.

Patented May 25, 1909.

Attest:
F. E. Alexander
S. W. Meixner

George N. Williams Jr
Julius Wegner
Inventors
by their Atty.,

UNITED STATES PATENT OFFICE.

GEORGE N. WILLIAMS, JR., AND JULIUS WEGNER, OF NEW YORK, N. Y., ASSIGNORS TO SAID WILLIAMS.

CAP-PLATE FOR CYLINDRICAL SAW-BLADES AND MEANS FOR ATTACHMENT OF THE SAW-BLADE THERETO.

No. 922,650.   Specification of Letters Patent.   Patented May 25, 1909.

Application filed September 13, 1907. Serial No. 392,796.

*To all whom it may concern:*

Be it known that we, GEORGE N. WILLIAMS, Jr., a citizen of the United States, residing in the borough of Manhattan, city, county, and State of New York, and JULIUS WEGNER, a citizen of Russia, residing at Astoria, in the borough of Queens, county of Queens, in said city and State, have invented certain new and useful Improvements in Cap-Plates for Cylindrical Saw-Blades and Means for Attachment of the Saw-Blades Thereto, of which the following is a specification.

In a prior application (series of 1900, No. 388,718 filed August 15, 1907) we have described "Improvements in cap-plates for cylindrical saw-blades and in the attachment of the saw blade thereto" wherein are shown saw blades adapted to cut large cylindrical blocks of stone such as are employed in the building up of columns in architectural work. Our said earlier application embraces a cap-plate adapted to the reception of cylindrical saw blades of varying diameters.

The object of this invention is to provide a cap-plate for cylindrical saw blades of the character described in said earlier application, and a means for attachment of the saw blade thereto, wherein the joint between the cap-plate and the saw blade is substantially sealed, whereby air pressure or hydraulic pressure may be employed within and the water supplied in the cutting process with the debris resulting from that process, may be driven out from the kerf to the outside of the cutting blade and thus to the surface of the stone being operated upon. We have ascertained that in the operation of saw blades of the character described in our said previous application, there is danger of clogging of the saw blade in the circular kerf and consequent fracture of the blade, unless after the blade shall have cut a short distance into the stone, provision be made by employment of air or water pressure in flushing the kerf with water so that the debris of the cutting operation may be driven out with the water.

The cap-plate of this, our invention, is also adapted to the reception of saw blades of varying diameters retained therein by a multiplicity of holders and provided with means for maintaining substantial parallelism between the cutting edge of the saw blade and the face of the cap-plate, means of readily centering the saw blade on the center of rotation of the cap-plate, as well as means whereby one edge of the saw blade is maintained in circular form.

Our invention consists also in the various combinations and constructions hereinafter described and claimed.

Figure 2:
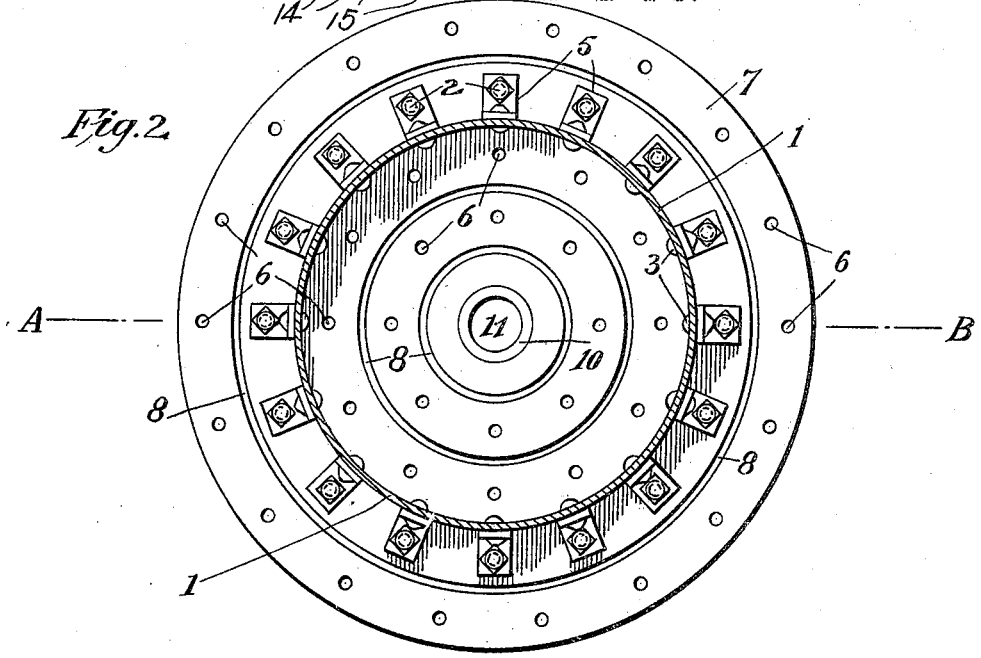
Figure 3:
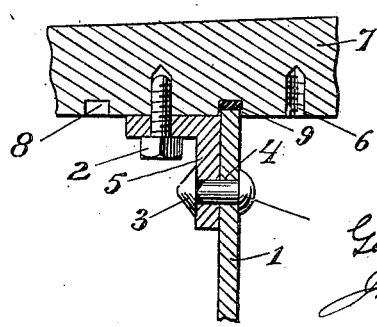

In the accompanying drawings, which form part of this specification, Figure 1 is a cross section of the cap-plate and the portion of the saw blade through the line A—B of Fig. 2. Fig. 2 is a plan view showing, with reference to Fig. 1, the under surface of the cap-plate, and Fig. 3 is an enlarged sectional view showing one of the holders and parts of the saw blade and cap-plate.

Referring now to these figures, 1 is a saw-blade which is made by welding or otherwise into the form of a hollow cylinder. At one edge thereof, called the "cutting edge" are shown teeth or cutters inserted therein in the ordinary manner and hereafter referred to.

7 is the cap-plate or holder, one surface thereof being adapted for reception of the saw blade. Cap-plate 7 is suitably attached to rotating shaft 10 as shown. On the plane or faced surface of cap-plate 7 are cut circular grooves 8 8 8 as shown, for reception of one edge of the saw blade. Each of said circular grooves 8 8 8 is centered on the center of rotation of cap-plate 7 for the purpose among other things of truly centering the saw blade. Said grooves 8 8 8 are of such diameters respectively as to readily adapt them to the diameter of the saw blade which it is desired to use. We provide that said grooves 8 8 8 may be somewhat wider than the thickness of the edge of the saw blade which may be drawn up in one of said grooves 8 8 8, as shown. We also provide that a gasket 9 may be interposed between the edge of the saw blade and the cap-plate 7, if desired.

In order to draw the edge of the saw blade snugly against the surface of cap-plate 7 at a number of different points about the circumference of the saw blade, the blade is perforated at 4 4 4 for reception of the rivets 3 3 3 employed to secure holders 5 5 5 near the edge of the saw blade. In Fig. 3 we have shown holder 5 secured a distance below the edge of the saw blade to permit that edge to be drawn into circular grooves 8 8 8, as above described. Holders 5 5 5 are made of metal or other suitable material and L-shaped, as shown. They are perforated for reception of screw bolt 2. Screw bolts 2 are adapted to threaded holes 6 tapped into cap-plate 7. For greater security against escape of the air or hydraulic pressure these screw holes 6 are shown passing only partly through the solid cap-plate 7. In the drawings we have shown sixteen of these holders 5 arranged about the circumference of the cylindrical saw-blade which, with their screw bolts 2, are adapted to draw said edge up into the groove 8, at sixteen different points. Obviously more or less of these holders 5 may be employed to firmly and tightly hold the edge of the saw blade against the cap-plate in view of the diameter of the saw blade and the flexibility of the metal of which it is composed. By means of holders 5, secured as shown to the saw blade, and drawing its edge into the grooves 8 8 8 of the solid cap-plate tightly against the gasket 9, it will be obvious that a substantially sealed space is provided when the saw blade is in operation (i. e. closed at one edge of the saw blade by the solid cap-plate and at the other edge by the stone being operated upon) wherein either air or water pressure may be supplied to clear the kerf and free the saw blade in its work as described. For this purpose rotating shaft 10 is made hollow at 11, as shown, for the introduction of water and air under pressure or of water alone under pressure, as desired. In the drawings we have shown four grooves 8 adapted to saw blades of various diameters. Obviously more or less of these grooves may be provided for accommodation of a greater variety of sizes of saw blades.

Obviously other means than holders 5 with their attachments, the grooves 8, and the gaskets 9 may be employed to perfect a substantially air-tight joint between the cap-plate and the edge of the saw blade, and we do not confine ourselves to the specific means here shown, the purpose being to provide a means for readily making a substantially air-tight joint between the cap-plate and any one of the various sizes of saw blades which it is desired to use in combination therewith, and at the same time to readily true and center the saw blade and confine one edge of it to substantially circular form by means of a multiplicity of holders for the purpose above stated.

In construction of the above we prefer that the opposite edges of the saw blade be faced so as to be substantially parallel with each other, as described in our said previous application, and also that the surface of the cap-plate to which the saw blade is to be drawn be faced as nearly as may be to a true plane at right angles with the axis of rotation of shaft 10 as is also in our said previous application described; and we also prefer that grooves 8 8 8 cut in the surface of the cap-plate, as shown, be of substantially uniform depth throughout their entire circumference in order that substantial parallelism between the surface of the cap-plate and the cutting edge of the saw blade may be maintained.

In the saw-blade we employ rectangular teeth 14, which are inserted at the edge of the blade in the ordinary manner. The diamonds are indicated at 15. They are inserted in the teeth for the purpose of rapid cutting. Any other kind of teeth than diamond teeth, however, may be employed adapted to cut under the action of the rapid rotary motion.

The rotating cylindrical saw blade with its cap-plate may be fed to the stone or the stone may be fed to the rotating saw blade; also rotating shaft 10 may be mounted in any proper machine frame and rotary motion imparted thereto in any suitable manner.

We claim:

1. The combination with a cylindrical saw blade of a rotating cap-plate therefor, means whereby said cap-plate may be rotated, a multiplicity of holders disposed about the circumference of one edge of the saw blade adapted to draw and hold said edge at a number of different points against the surface of the cap-plate and means whereby the joint between the cap-plate and the saw blade is substantially sealed for employment of air or hydraulic pressure within.

2. The combination with a cylindrical saw blade of a rotating cap-plate therefor, means whereby said cap-plate may be rotated, a multiplicity of holders disposed about the circumference of one edge of the saw blade adapted to draw and hold said edge at a number of different points against the surface of the cap-plate, means whereby the joint between the cap-plate and the saw blade is substantially sealed for employment of air or hydraulic pressure, and means supported by the cap-plate whereby said last named edge of the saw blade is maintained in circular form.

3. The combination with a cylindrical saw blade of a rotating cap-plate therefor, means whereby said cap-plate may be rotated, a multiplicity of holders disposed about the circumference of one edge of the saw blade adapted to draw and hold said edge at a number of different points against the surface of the cap-plate, means whereby the joint between the cap-plate and the saw blade is substantially sealed for employment of air or hydraulic pressure, means supported by the cap-plate whereby said last named edge of the saw blade is maintained in circular form, and means supported by the cap-plate for readily centering the saw blade on the center of rotation of the cap-plate.

4. The combination with a cylindrical saw blade faced at both edges and having its cutting edge armed with teeth or cutters of a rotating cap-plate faced upon one side, means whereby said cap-plate may be rotated, a multiplicity of holders disposed about the circumference of the other edge of the saw blade adapted to draw and hold said edge against the faced surface of the cap-plate whereby substantial parallelism is maintained between the cutting edge of the saw blade and the faced surface of the cap-plate, and means whereby the joint between the cap-plate and the saw blade is substantially sealed for employment of air or hydraulic pressure within.

5. The combination of a cap-plate for rotating cylindrical saw blades, a multiplicity of holders disposed about the circumference of one edge of the saw blade adapted to draw and hold said edge at a number of different points against the surface of the cap-plate, means whereby the joint between the cap-plate and the saw blade is substantially sealed for employment of air or hydraulic pressure within, and means in said cap-plate whereby saw blades of varying diameters may be similarly joined thereto.

6. The combination of a cap-plate for rotating cylindrical saw blades, a multiplicity of holders disposed about the circumference of one edge of the saw blade adapted to draw and hold said edge at a number of different points against the surface of the cap-plate, means whereby the joint between the cap-plate and the saw blade is substantially sealed for employment of air or hydraulic pressure within, means in said cap-plate whereby saw blades of varying diameters may be similarly joined thereto, and means supported by the cap-plate whereby the saw blade is maintained in circular form.

7. The combination of a cap-plate for rotating cylindrical saw blades, a multiplicity of holders disposed about the circumference of one edge of the saw blade adapted to draw and hold said edge at a number of different points against the surface of the cap-plate, means whereby the joint between the cap-plate and the saw blade is substantially sealed for employment of air or hydraulic pressure within, means in said cap-plate whereby saw blades of varying diameters may be similarly joined thereto, means supported by the cap-plate whereby the saw blade is maintained in circular form, and means supported by the cap-plate for readily centering the saw blade on the center of rotation of the cap-plate.

8. A cap-plate for cylindrical saw-blades provided with circular grooves adapted to saw-blades of different diameters, and means whereby a substantially air tight joint be-between the cap-plate and any one of the various sizes of saw-blades is substantially sealed for employment of air or hydraulic pressure within, and means whereby said cap-plate may be rotated.

GEORGE N. WILLIAMS, Jr.,
JULIUS WEGNER.

Witnesses:
SAMUEL ADLER,
ALICE NICHOLS.